(12) United States Patent
Kawalkar

(10) Patent No.: US 9,688,392 B2
(45) Date of Patent: Jun. 27, 2017

(54) THRUST MANAGEMENT AND INTERFACE FOR AIRCRAFT TAXI OPERATIONS

(71) Applicant: HONEYWELL INTERNATIONAL INC., Morristown, NJ (US)

(72) Inventor: Amit Nishikant Kawalkar, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 310 days.

(21) Appl. No.: 14/316,606

(22) Filed: Jun. 26, 2014

(65) Prior Publication Data
US 2015/0375853 A1   Dec. 31, 2015

(51) Int. Cl.
| B64C 25/50 | (2006.01) |
| B64C 25/40 | (2006.01) |
| B64D 31/04 | (2006.01) |
| B64D 31/06 | (2006.01) |
| B64D 43/02 | (2006.01) |

(52) U.S. Cl.
CPC .......... B64C 25/405 (2013.01); B64D 31/04 (2013.01); B64D 31/06 (2013.01); B64D 43/02 (2013.01); *Y02T 50/823* (2013.01)

(58) Field of Classification Search
USPC .................................. 244/50, 103 R, 100 R
See application file for complete search history.

(56) References Cited

U.S. PATENT DOCUMENTS

| 4,610,411 A * | 9/1986 | Veaux ..................... B64C 25/50 180/428 |
| 7,891,609 B2 * | 2/2011 | Cox ....................... B64C 25/405 244/100 R |
| 7,946,165 B2 * | 5/2011 | Cahill .................... B64D 45/00 73/146 |
| 8,035,502 B2 * | 10/2011 | Heise ................... B60C 23/0411 310/339 |
| 8,676,399 B2 | 3/2014 | Nutaro et al. |
| 9,033,273 B2 * | 5/2015 | Edelson ................ B64C 25/405 244/103 R |
| 2006/0065779 A1 * | 3/2006 | McCoskey ................ B64F 1/32 244/100 R |
| 2009/0218440 A1 * | 9/2009 | Dilmaghani .......... B64C 25/405 244/50 |

(Continued)

FOREIGN PATENT DOCUMENTS

EP  0871859  10/1998

*Primary Examiner* — Christopher P Ellis
(74) *Attorney, Agent, or Firm* — Shimokaji IP

(57) ABSTRACT

An aircraft electric taxi drive system may provide electric taxiing of an aircraft by integrating control of an electric drive and an engine during the taxi phase of a flight plan. In some embodiments, the engine may provide supplemental drive to the aircraft's wheels during electric taxiing. The engine may be maintained on while the electric drive provides the main driving force to the wheels. A controller may determine the criteria to operate the engine as the electric drive taxis the aircraft to achieve a target ground speed. In some embodiments, a pilot interface may integrate control of the electric drive and the engine into a single throttle control providing the pilot an intuitive and singular point to throttle the aircraft without having to decide which taxi source is providing the taxi driving force.

11 Claims, 4 Drawing Sheets

(56) References Cited

U.S. PATENT DOCUMENTS

| | | | |
|---|---|---|---|
| 2009/0261197 A1* | 10/2009 | Cox | B64C 25/36 244/50 |
| 2011/0089289 A1* | 4/2011 | Wilson | B64C 25/405 244/50 |
| 2012/0104160 A1* | 5/2012 | Baumann | B64C 25/405 244/50 |
| 2012/0217339 A1* | 8/2012 | Gilleran | B64C 25/405 244/50 |
| 2013/0200209 A1* | 8/2013 | Goldman | B64C 25/405 244/50 |
| 2014/0027571 A1* | 1/2014 | Barmichev | B60C 11/1612 244/103 R |

\* cited by examiner

THRUST MANAGEMENT AND INTERFACE FOR AIRCRAFT TAXI OPERATIONS

BACKGROUND OF THE INVENTION

The present invention generally relates to vehicle controls, and more particularly to a thrust management and interface for aircraft during taxi operations.

Conventionally, aircraft may taxi by thrusting the engines at low levels with the landing gear down. The resultant thrust pushes the aircraft forward. Using the aircraft engines burns jet fuel. Jet engines may operate with less efficiency at lower settings. Since an aircraft may spend hours a day in the taxi phase of a flight plan, excess fuel costs may be directly tied to the taxi phase.

Some aircraft may incorporate electric taxi (eTaxi) systems which move aircraft along taxi ways during the taxi phase. The eTaxi systems may electrically drive the wheels with a motor. An eTaxi system may work well on smaller aircraft whose weight may not overload the wheels. However, on larger aircraft, the weight of the aircraft and increased frictional force may impede wheel rotation under current electric drive capabilities. For example, an eTaxi system may not provide enough impetus to produce sufficient momentum for an aircraft to move from a dead stop (such as at the start of taxiing). Larger aircraft may also encounter points along the taxi way that increase the load on the wheels (for example, dips in the road or slippery conditions which may cause wheel slippage). The aircraft's momentum is thus reduced sometimes to a halt.

Increasing the current to the electric motor may not produce enough torque to regain momentum and in some cases may overdrive the motor into failure.

One approach may require a pilot to use the eTaxi system separately from the engine(s) during taxiing. The pilot may restart engines on need when eTaxi systems are insufficient. Typically separate throttle controls may be dedicated to the eTaxi and engine systems. The pilot may often have to guess as to how much of each throttle source is needed at any given point along the taxi phase. As may be appreciated, having to engage separate throttle systems for the same phase of the flight plan may require increased focus and potentially may raise the possibility of pilot error. In addition, starting and re-starting of engines increases the hazard of potential fire. Aircraft engines are known to produce fireballs or flare-ups during engine start-up. Typically, a crew is present during the initial start-up of the aircraft to combat flames. However, a crew may not follow the aircraft along the taxi way. Thus, restarting engines along different points of the taxi way may produce a dangerous situation.

Also, in smaller aircraft that use eTaxi systems, engine starting may need 3 minutes before the aircraft is allowed to takeoff from the runway. The engine start-up process increases the potential for fire hazard out on the runway. It may become difficult for fire fighting vehicles and personnel to access the aircraft out on the runway during a fire emergency. Also, there are times when an engine may develop starting issues and may never start. In this case, the aircraft has to be taxied back into the apron area for maintenance. Turning the aircraft around may be labor intensive and may cause significant delays to other aircraft queued up to take off behind the immobilized aircraft.

As can be seen, there is a need to provide an improved approach to thrusting an aircraft during taxi operations. In addition, it can be seen that the pilot may benefit from simplifying the interface during taxi operations.

SUMMARY OF THE INVENTION

In one aspect of the present invention, an aircraft electric taxi system comprises an engine; wheels; an electric drive configured to drive the wheels; and a controller integrating control of the engine and control of the electric drive.

In another aspect of the present invention, a method of taxiing an aircraft comprises setting a target ground speed; operating an electric drive to provide a first driving force to wheels of the aircraft to reach the target ground speed; and operating an engine of the aircraft to selectively provide a second driving force to the wheels while simultaneously operating the electric drive.

In yet another aspect of the present invention, an aircraft pilot interface comprises a display; a ground speed indicator on the display; a controller configured to: operate throttling of an electric drive during taxiing of the aircraft, and operate throttling of an engine to supplement throttling of the electric drive during the taxiing of the aircraft, wherein the ground speed indicator displays a ground speed provided by a simultaneous operation of the electric drive and the engine.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

In general, exemplary embodiments of the present invention provide supplemented driving power for an aircraft during the taxi phase of a flight plan. In addition, exemplary embodiments provide a simplified and an intuitive pilot interface for controlling throttle during the taxi phase.

Figure 1:
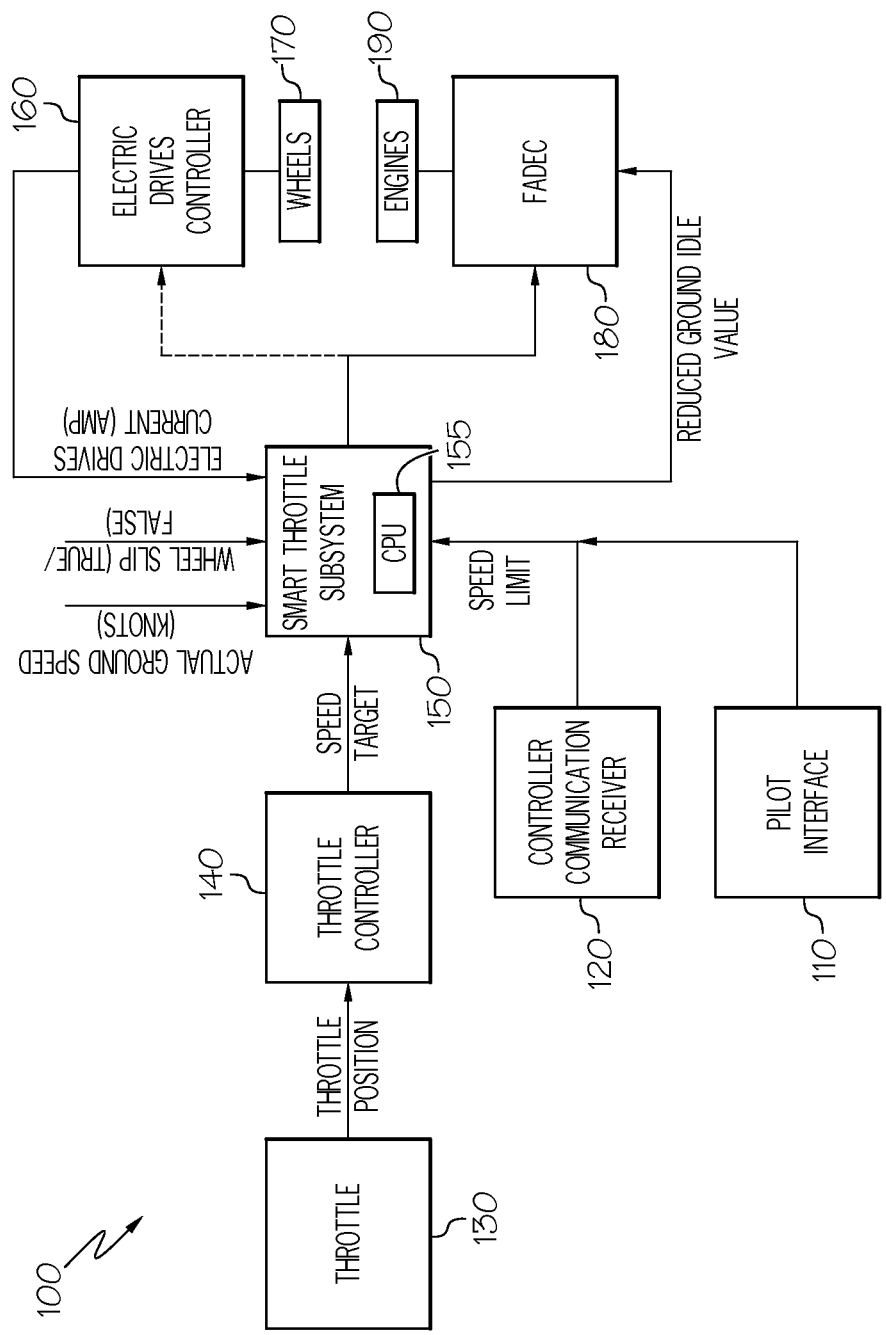
FIG. 1 is a block diagram of an aircraft electric taxi system according to an exemplary embodiment of the present invention.

Referring now to FIG. 1, an aircraft electric taxi system 100 (referred to generally as the system 100) is shown according to an exemplary embodiment of the present invention. While not shown, it will be understood that system 100 may control movement of an aircraft during, for example the taxi phase of a flight plan. The system 100 may control the driving of wheels 170 and an engine(s) 190 to taxi the aircraft. In an exemplary embodiment, the engine(s) 190 may be maintained turned on simultaneously with operation of an electric drive 160. The electric drive 160 may be the primary taxi source driving the wheels 170 to move the aircraft along its taxi path (for example, as an eTaxi system). The engine(s) 190 may be turned on prior to operating the electric drive 160. The engine(s) 190 may be selectively operated via a full authority digital engine control (FADEC) 180 to provide a supplemental driving force to move the aircraft when the electric driving force of the electric drive 160 may be insufficient to move the wheels 170. In an exemplary embodiment, the engine(s) 190 may be maintained on and in an idle mode while the electric drive 160 drives the wheels 170. In the event, the wheels 170 are unable to sufficiently move the aircraft under electric drive, the engine(s) 190 may be gradually throttled to produce sufficient aircraft momentum until the electric drive 170 can continue to keep the wheels 170 moving without engine 190 assistance.

The system 100 may include a pilot interface 110, a controller communication receiver 120, and a throttle input 130. The pilot interface 110 may be an electronic display providing operational settings to a pilot. Additional details of the pilot interface 110 are described below. The controller communication receiver 120 may receive messages from ground controller (not shown). For example, the maximum speed limit for taxi operation at an airport may be received by the controller communication receiver 120 as issued from the ground controller (not shown). The throttle input 130 may be an input mechanism for increasing/decreasing throttle of the aircraft during taxi. For example, the throttle input 130 may be a manual lever or may be a digital button shown on the pilot interface 110. In an exemplary embodiment, the throttle input 130 may adjust throttling of the electric drive 160 and the engine(s) 190 from a single lever/button during the taxi phase. In some embodiments, the electric drive 160 may be disconnected from the throttle input 130 when the aircraft is not in the taxi phase of the flight plan. A throttle controller 140 may be connected to and may control throttle increase/decrease commands received from the throttle input 130.

A smart throttle subsystem controller 150 (referred to generally as the subsystem 150 or the controller 150) may be connected to and may receive input commands from the pilot interface 110, the controller communication receiver 120, and the throttle controller 140. The smart throttle subsystem 150 may be connected to the electric drive 160 and to the FADEC 180. The smart throttle subsystem 150 may include a processing unit 155 coordinating throttling of the electric drive 160 and throttling of the engine 190 (via the FADEC 180) based on the input commands received from the pilot interface 110, the controller communication receiver 120, and the throttle controller 140. For example, upon receipt of a throttle increase command from the throttle controller 140, the subsystem 150 may increase a motor current supplied to the electric drive 160 or may drive the FADEC 180 to increase output from the engine(s) 190. The subsystem 150 may determine whether the source of propulsion needed to drive the wheels 170 comes from the electric drive 160 and/or the engine(s) 190. For example, the controller 150 may be configured to drive the engine(s) 190 in response to the wheels 170 being unable to move while being driven by the electric drive 160.

In an exemplary embodiment, the controller 150 may integrate control of the engine(s) 190 and control of the electric drive 160 from the singular throttle input 130. Thus, from the pilot's perspective, it may not be necessary to select the source of propulsion. Instead, the pilot may simply input a desired ground speed. The subsystem 150 may then determine if the electric drive 160 moves the aircraft with enough acceleration to achieve the desired ground speed within a predetermined time frame (for example, 20 knots within 1 minute). In response to the wheels 170 deflecting below a threshold level of rotation (for example, 5 degrees/second), the controller 150 may drive the engine(s) 190 to provide a temporary supplemental force moving the aircraft.

In an exemplary embodiment, the electric drive 160 may provide the first driving source to the wheels 170. Feedback signals from the electric drive 160 may be provided to the subsystem 150. The processing unit 155 may determine whether the motor current should be increased to achieve a target ground speed or whether the engine(s) 190 should be engaged to add a secondary driving force to move the wheels 170. For example, in response to an actual ground speed being below a threshold level (for example, below approximately 1 knot) and the motor current reaching or being above a threshold level (for example, above 90% of a threshold current rating for the electric drive 160), the FADEC 180 may be commanded by the subsystem 150 to gradually increase engine RPMs from idle to an RPM level causing wheel deflection above a threshold rotation (for example approximately 5 degrees of rotation). The subsystem 150 may monitor the feedback signals to detect sufficient momentum in the aircraft after engaging the engine(s) 190. For example, once the aircraft reaches a threshold ground speed (for example, 2 knots) or a threshold level of wheel deflection is detected, the controller 150 may command the FADEC 180 to reduce engine speed.

Another feedback signal which may cause the controller 150 to increase engine(s) 190 output is the detection of wheel slippage. Since aircraft wheels 170 may have treads (not shown) for push action (as compared to automobile wheels which may have treads designed for pull action), the wheels 170 may skid thus registering rotation without ground speed movement. Detected wheel slippage may indicate to the subsystem 150 that the FADEC 180 should provide a burst of engine 190 output to overcome the lack of torque in the wheels 170.

Figure 2:
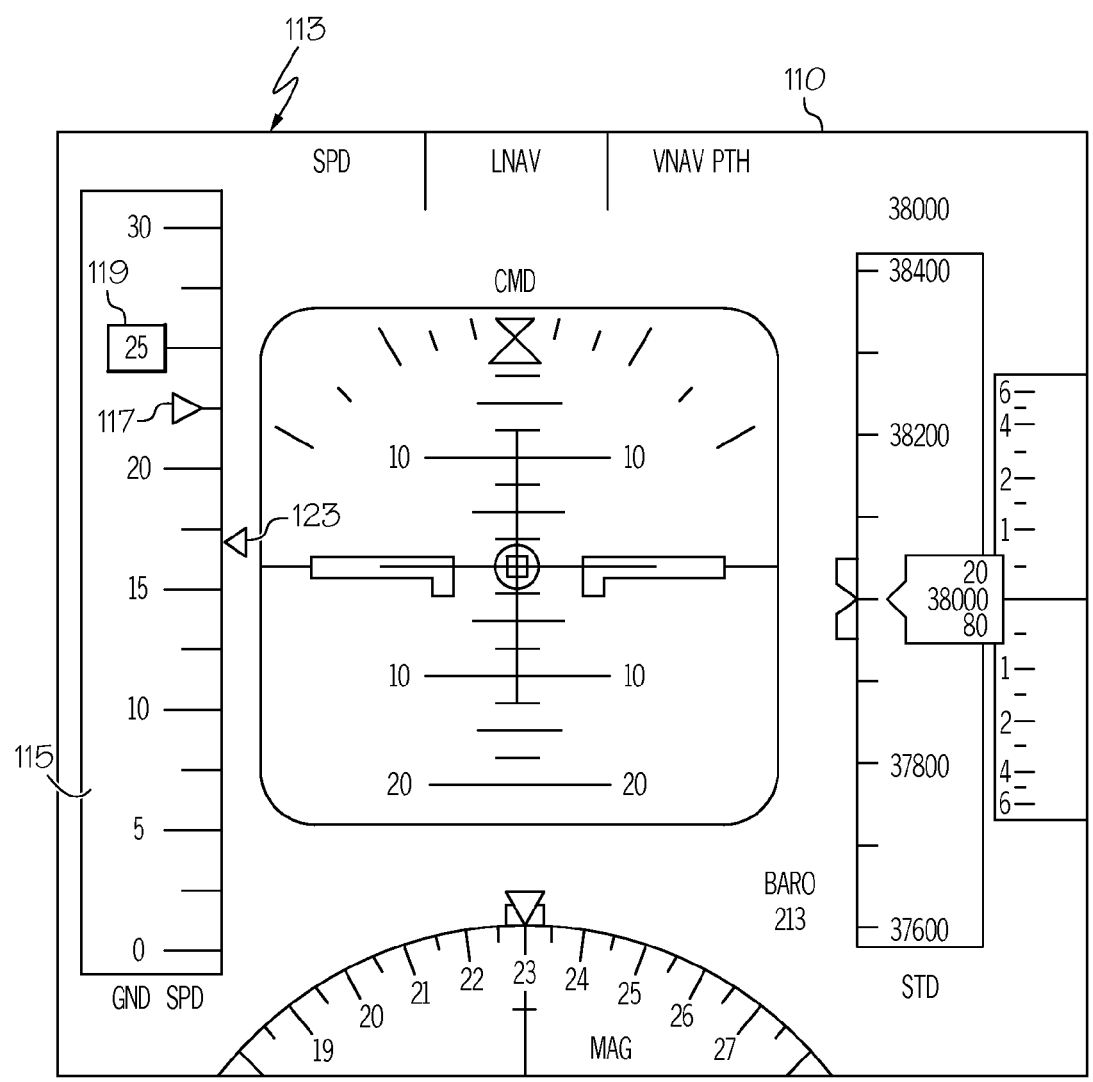
FIG. 2 is a pilot interface according to an exemplary embodiment of the present invention.

Referring now to FIGS. 1 and 2 concurrently, the pilot interface 110 is shown according to an exemplary embodiment of the present invention. Information in the pilot interface 110 may be shown on a display 113. The pilot interface 110 may provide an intuitive throttle command during taxi by enabling display of a ground speed tape 115. The ground speed tape 115 may temporarily replace, for example, an indicated airspeed (IAS) tape (not shown) during taxi operations. For example, the ground speed tape 115 may display a scale between 0-30 knots which may be appropriate for ground speed operations. The pilot may set a target ground speed 117 via the throttle input 130. The subsystem 150 may throttle the electric drive 160 to achieve the target ground speed 117. The ground speed tape 115 may provide an actual ground speed indicator 123 for any given moment during taxi movement. The actual ground speed displayed may be a function of the electric drive 160 and the engine(s) 190 operating simultaneously In some embodiments, the pilot interface 110 may include a speed limit function shown as a speed limit 119 which may be inputted by the pilot. The speed limit 119 may be set depending on airport conditions provided by the ground controller. For example, the traffic density of ground traffic ahead of the aircraft or pilot visibility may be criteria used to determine the speed limit 119. For example, in low density traffic, the speed limit may range from 0 knots to 30 knots. In medium density traffic, the speed limit may range from 0 knots to 20 knots. In high density traffic, the speed limit may range from 0 knots to 10 knots. Higher visibility may allow for a larger speed limit 119 range; lower visibility may indicate a lower speed limit 119 should be implemented. The airport conditions (surface traffic density and visibility) may be provided by the ground controller (not shown) to the controller communication receiver 120. The processing unit 155 may determine the speed limit 119 based on the received surface traffic density. The subsystem 150 may prevent the target ground speed 117 from being set above the speed limit 119. From the pilot's perspective, the pilot interface 110 does not require the pilot to decide when to engage the engine(s) 190. The pilot may operate the throttle input 130 to achieve the target ground speed 117 and the subsystem 150 may operate the engine(s) 190 as needed. If the pilot sees that the actual ground speed indicator 123 is near 0 knots, then the pilot may increase throttle and the subsystem 150 may determine that engine thrust is needed. The processing unit 155 (FIG. 1) may provide a safety function by sending a message through the controller communication receiver 120 alerting the ground controller (not shown) in response to the speed limit 119 being exceeded. Thus, ground control may send the pilot a communication to slow down to avoid dangerous conditions. In some embodiments, the processing unit 155 may detect the speed limit 119 being exceeded and may provide an alert to the pilot through the display 113. When the aircraft exits the taxi operations, the ground speed tape 115 may be replaced with a convention IAS speed tape (not shown).

Figure 3A:
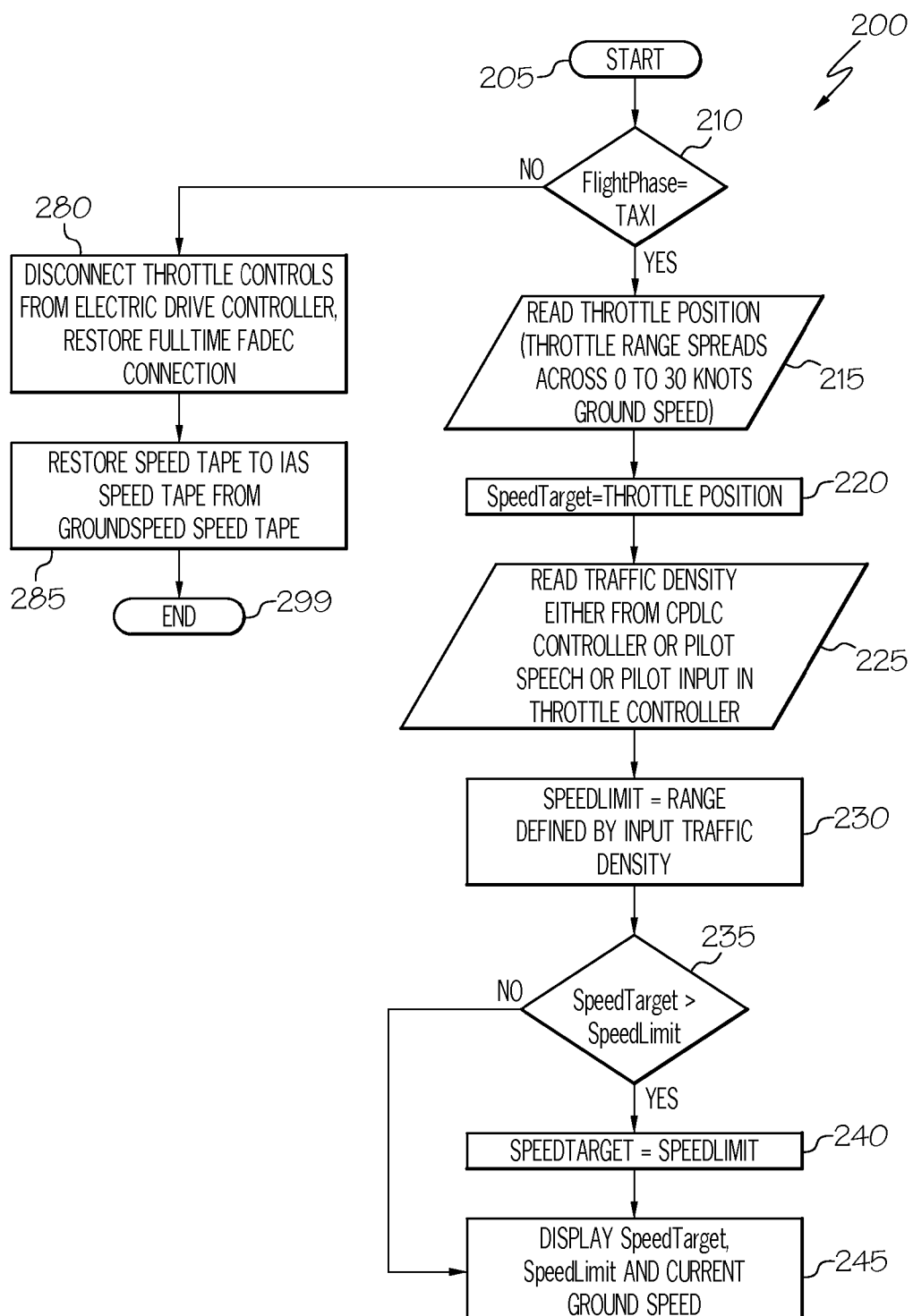
FIGS. 3A and 3B are a flow chart of a method of taxiing an aircraft according to an exemplary embodiment of the present invention.
Figure 3B:
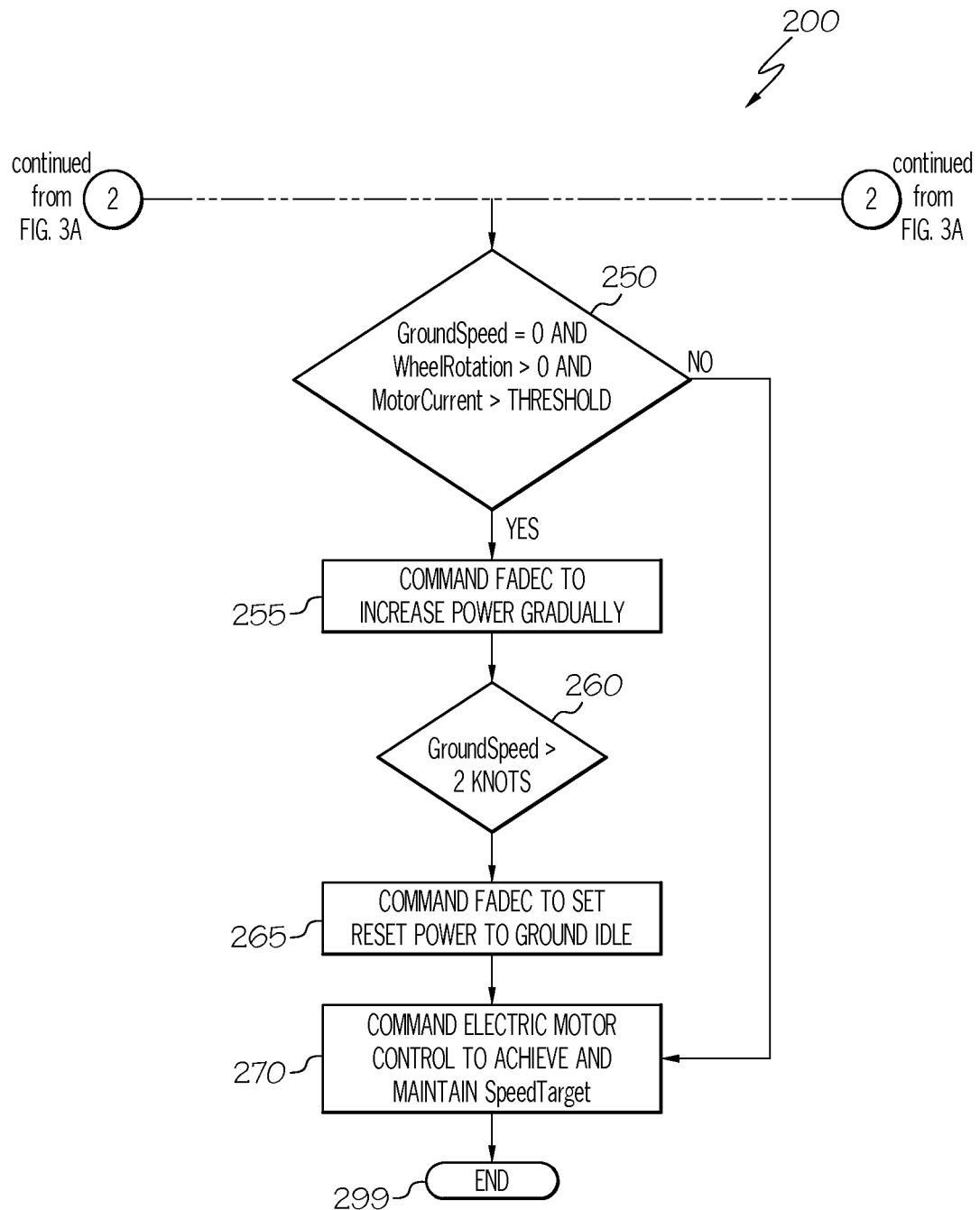

Referring now to FIGS. 3A and 3B, a method 200 of taxiing an aircraft is shown according to an exemplary embodiment of the present invention. The method 200 may control taxiing of an aircraft, using the features described above (for example, the smart throttle subsystem controller 150). In block 205, the method 200 may start and a check may be made at block 210 determining whether the aircraft is in a taxi phase of a flight plan. If the aircraft is in the taxi phase an electric drive may be the primary source driving the aircraft's wheels. The aircraft's engine(s) may be maintained on in an idle state while the electric drive provides the primary taxi impetus. In block 215, a ground speed tape may be displayed (either instead of or in conjunction with an indicated airspeed tape on a pilot interface) and the current ground speed (throttle position) of the aircraft may be read from the ground speed tape. In block 220, the current ground speed may be compared to a ground speed target set by the pilot. In block 225, a current ground traffic density may be read. The ground traffic density may be provided by either controller pilot data link communication (CPDLC) (not shown) or by pilot input (provided either by throttle control or by pilot speech in systems enabled with voice recognition). In block 230, the speed limit may be set according to a range based on the ground traffic density. In block 235, it may be determined whether the target ground speed is greater than the speed limit. In response to the target ground speed being greater than the speed limit, in block 240, the ground speed target may be readjusted to the level of the speed limit. In response to the target ground speed not being greater than the speed limit, in block 245, the pilot interface may display the ground speed target, the speed limit, and the current ground speed. In block 250, load conditions on the wheels may be evaluated. For example, it may be determined whether the ground speed is approximately 0 knots, whether wheel rotation is greater than 0 degrees per second, and/or whether the motor current applied to the electric drive is greater than a threshold value. The three aforementioned conditions may indicate that too much of a load is being placed on the wheels and the aircraft is not moving sufficiently via electric drive means. In response to one or more of the three aforementioned conditions in block 250 being affirmative, power to the engine(s) (via a FADEC) may be increased gradually to provide momentum to the aircraft. In block 260, a determination may be performed as to whether the current groundspeed is above a threshold value (for example, 2 knots). In response to the determination in block 260 being affirmative, the wheels may be moving with sufficient momentum such that in block 265 the engine(s) may be throttled down to idle. In block 270, the electric drive may provide motor current driving the wheels to reach the target ground speed.

Referring back to block 210, should it be determined that the aircraft is not in the taxi phase, in block 280 the electric drive may be disconnected from the throttle control and throttling of the aircraft maybe provided by the engine(s) as the primary driving force. In block 285, the pilot interface may replace the ground speed tape (if necessary) with the display of the indicated airspeed tape. The method of taxiing an aircraft 200 may terminate at block 299 when the aircraft is not being taxied.

It should be understood, of course, that the foregoing relates to exemplary embodiments of the invention and that modifications may be made without departing from the spirit and scope of the invention as set forth in the following claims.

I claim:

1. An aircraft taxi system, comprising:
   a main engine;
   wheels;
   an electric drive configured to drive the wheels; and
   a controller integrating control of the main engine, from an idling state to a thrust producing state, and control of the electric drive during taxiing of the aircraft,
   wherein the controller is configured to autonomously increase thrust of the main engine from the idling state in response to the wheels being unable to move the aircraft at a desired speed while being driven by the electric drive.

2. The system of claim 1, wherein the controller is configured to increase thrust of the main engine in response to a motor current driving the wheels reaching a threshold value.

3. The system of claim 2, wherein the controller is configured to detect wheel deflection of the wheels.

4. The system of claim 3, wherein the controller is configured to reduce main engine speed in response to the wheels moving above a threshold rotation speed.

5. The system of claim 1, further comprising an electronic pilot interface displaying ground speed of an aircraft, the ground speed displaying taxiing of the aircraft as a function of the electric drive and the main engine operating simultaneously.

6. A method of taxiing an aircraft, comprising:
   setting a target ground speed;
   operating an electric drive to provide a first driving force to wheels of the aircraft to reach the target ground speed; and
   operating a main engine of the aircraft to selectively provide a second driving force to the aircraft while simultaneously operating the electric drive; and
   providing a controller to integrate control of the main engine, from an idling state to a thrust producing state, and control of the electric drive during taxiing of the aircraft, wherein the controller is configured to autonomously increase thrust of the main engine from the idling state in response to the wheels being unable to move the aircraft at a desired speed while being driven by the electric drive.

7. The method of claim 6, further comprising monitoring a current level driving the electric drive.

8. The method of claim 7, further comprising checking for a threshold wheel rotation.

9. The method of claim 8, further comprising operating the main engine in response to the current level reaching a threshold value and the wheel rotation dropping below a threshold wheel rotation.

10. The method of claim 9, further comprising reducing the second driving force in response to a ground speed of the aircraft reaching a threshold ground speed.

11. The method of claim 10, further comprising setting the main engine to idle as the electric drive operates to reach the target ground speed.

* * * * *